United States Patent Office

3,052,675
Patented Sept. 4, 1962

3,052,675
BIS-(HYDROXY-METHYL)-5α-PREGNANES AND DERIVATIVES THEREOF
Daniel Bertin, Montrouge, Antoine Locatelli, Aubervilliers, Jean Mathieu, Montfermeil, Georges Muller, Nogent-sur-Marne, and Hubert Fritel, Paris, France, assignors, by mesne assignments, to Roussel-UCLAF, S.A., Paris, France, a corporation of France
No Drawing. Filed Feb. 10, 1961, Ser. No. 88,282
Claims priority, application France Mar. 8, 1960
20 Claims. (Cl. 260—239.55)

The present invention relates to novel bis(hydroxymethyl)-5α-pregnanes and derivatives thereof and the process for the preparation of said compounds. The invention particularly relates to compounds having the formula

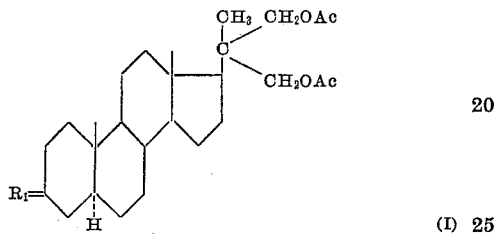

(I)

wherein $R_1$ is selected from the group consisting of $=O$ and

and Ac is selected from the group consisting of hydrogen, an acyl radical of an organic carboxylic acid having 1 to 18 carbon atoms and an anion of a mineral acid.

The products of the invention are distinguished by their cardiotropic activity coupled with a dilation action of coronaries. They are useful each time that a specific action on the heart muscle is necessary, this action being in addition accompanied with a beneficial augmentation of sanguinine irrigation of the said heart muscle.

It is an object of the invention to obtain novel bis-hydroxy-methyl)-5α-pregnanes of Formula I.

It is another object of the invention to provide processes for the preparation of the novel bis-(hydroxy-methyl)-5α-pregnanes of Formula I.

It is a further object of the invention to obtain novel intermediates for the preparation of the 20-bis-(hydroxymethyl)-5α-pregnanes of Formula I.

It is an additional object of the invention to prepare pharmaceutical compositions comprising 20-bis-(hydroxymethyl)-5α-pregnanes of Formula I for the treatment of heart conditions.

These and other objects and advantages of the invention will become obvious from the following detailed description.

The compounds of the invention of Formula I are produced from the novel intermediate having the formula

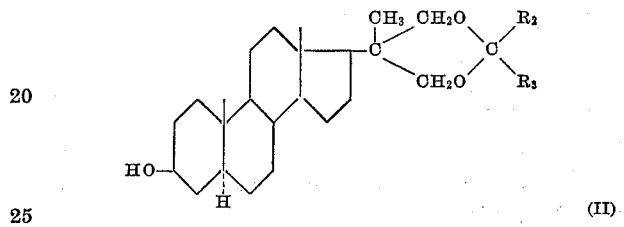

(II)

wherein $R_2$ and $R_3$, are selected from the group consisting of hydrogen, phenyl, phenyl substituted lower alkyl and lower alkyl. $R_2$ and $R_3$ are preferably methyl groups. The novel intermediate is reacted in a number of ways depending upon the desired final product.

The novel intermediates of Formula II are prepared by the Grignard reaction of 3β-acyloxy-5α-pregnane-20-one with a lower alkoxymethyl magnesium halide to form 3β-acyloxy-20-lower alkoxymethyl-5α-pregnane-20-ol, dehydration of the latter to form 3β-acyloxy-20-formyl-5α-pregnane, condensing said compound with formaldehyde and saponifying simultaneously to form 20-bis-(hydroxymethyl)-5α-pregnane-3β-ol and reacting the latter with a ketone or aldehyde to form compounds of Formula II. The reaction scheme is illustrated in Table I.

TABLE I

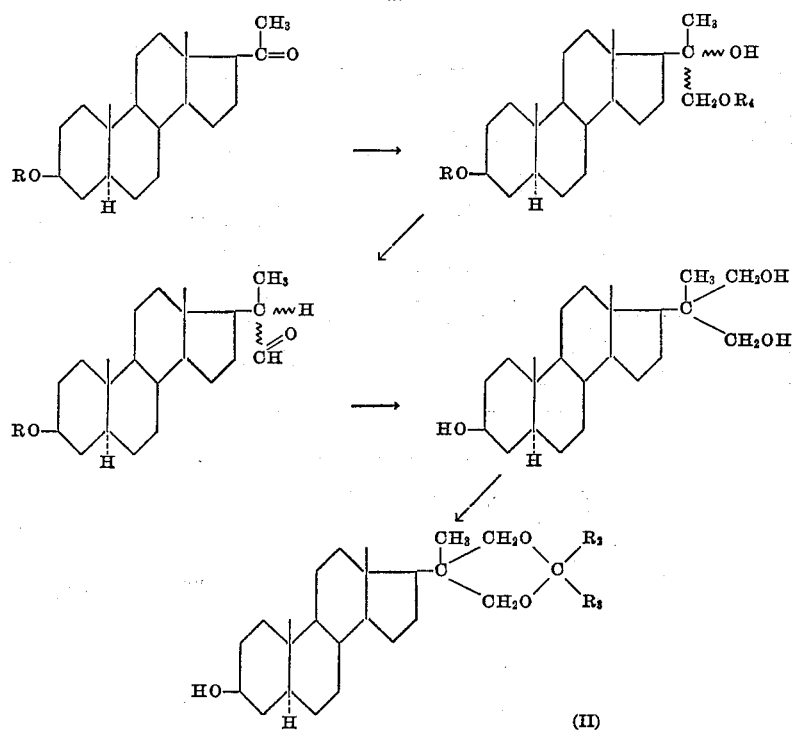

wherein R is an acyl group of an organic carboxylic acid having 1 to 18 carbon atoms and $R_2$ and $R_3$ are selected from the group consisting of hydrogen, phenyl, phenyl substituted lower alkyl and lower alkyl and $R_4$ represents a lower alkyl radical.

A preferred process for the preparation of the compounds of Formula II comprises reacting 3β-acyloxy-5α-pregnane-20-one with methoxy methyl magnesium bromide in an inert organic solvent such as tetrahydrofuran at low temperatures of the order of 0° to 10° C. in the presence of a mercuric halide catalyst such as mercuric chloride to form 3β-acyloxy-20-methoxy methylene-5α-pregnane-20-ol, reacting the latter with phosphorus oxychloride to form 3β-acyloxy-20-formyl-5α-pregnane, condensing said product with formaldehyde according to Tollens' reaction in the presence of methanolic potassium hydroxide to form 20-bis-(hydroxy-methyl)-5α-pregnane-3β-ol and reacting the latter with an aldehyde or ketone such as acetone at room temperature in the presence of perchloric acid to form compounds of Formula II.

The ketone or aldehyde may be aliphatic or aromatic. Examples of suitable ketones are acetone, methyl ethyl ketone, ethyl propyl ketone and acetophenone. Examples of suitable aldehydes are formaldehyde, acetaldehyde, butyraldehyde, benzaldehyde and phenylacetaldehyde.

The process for the preparation of compounds of Formula I wherein $R_1$ is

comprises acylating the alkylidene or arylalkylidene of Formula II to form the alkylidene or arylalkylidene of 3β-acyloxy-20-bis-(hydroxy-methyl)-5α-pregnane and reacting the latter under acidic conditions to form 3β-acyloxy-20-bis-(hydroxy-methyl)-5α-pregnane. The 20-bis-hydroxy-methylene groups of this latter compound may be esterified with an organic carboxylic acid having 1 to 18 carbon atoms or a mineral acid and, if desired, then hydrolyzing the esterified product to form 20-bis-(acyloxy methyl)-5α-pregnane-3β-ol.

A preferred process for preparing compounds of Formula I wherein $R_1$ is

comprises preparing the acetonide of 20-bis-(hydroxy-methyl)-5α-pregnane-3β-ol as discussed previously, acylating said acetonide with acetic acid anhydride in pyridine to form the acetonide of 3β-acetoxy-20-bis-(hydroxy-methyl)-5α-pregnane and reacting said product with aqueous acetic acid or a mineral acid in an aqueous alcoholic medium to form 3β-acetoxy-20-bis-(hydroxy-methyl)-5α-pregnane. This compound may esterified in the 20-bis-(hydroxy-methyl) groups by reacting with fuming nitric acid at temperatures about −5° to −15° C. to form 3β-acetoxy-20-bis-(nitrato methyl)-5α-pregnane which can then be saponified to form 20-bis-(nitrato methyl)-5α-pregnane-3β-ol. This preparation is illustrated in Table II.

TABLE II

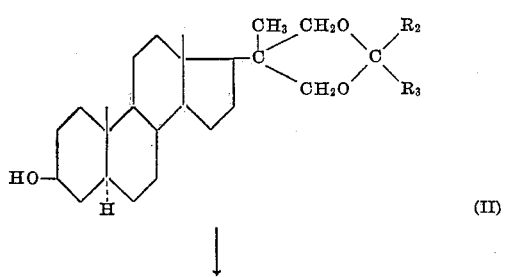

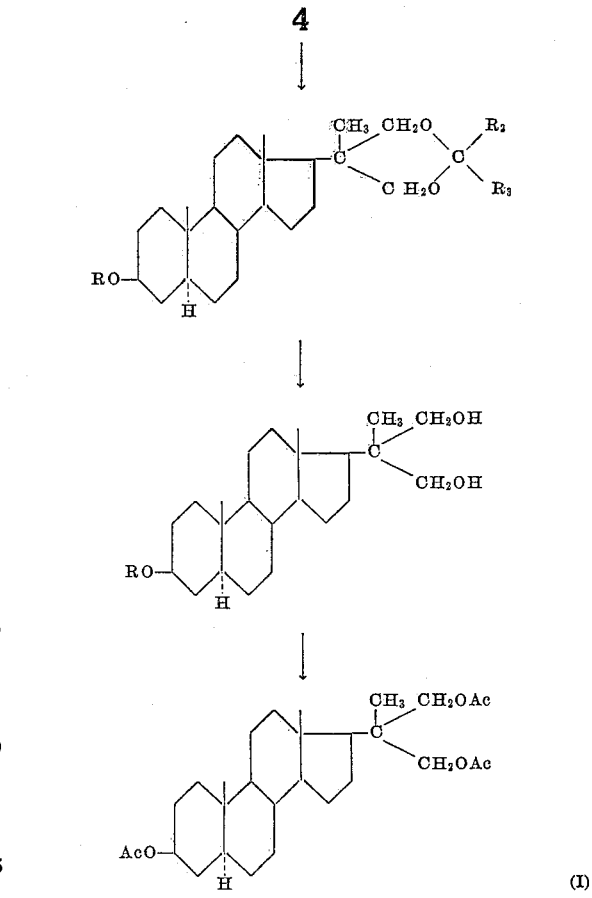

wherein R, Ac, $R_2$ and $R_3$ have the above definitions.

The method for the preparation of compounds of Formula I which possess a 3-one group ($R_1$=O) comprises oxidizing the alkylidene or arylalkylidene of 20-bis-(hydroxy-methyl)-5α-pregnane-3β-ol to form the alkylidene or arylalkylidene of 20-bis-(hydroxy-methyl)-5α-pregnane-3-one, reacting the latter under acidic conditions to form 20-bis-(hydroxy-methyl)-5α-pregnane-3-one and reacting said compound with an esterifying agent to form 20-bis-(acyloxy-methyl)-5α-pregnane-3-one.

A preferred process for preparing 3-one compounds of Formula I comprises oxidizing the acetonide of 20-bis-(hydroxy-methyl)-5α-pregnane-3β-ol with chromic acid in pyridine at temperature between 0 and 15° C. to form the acetonide of 20-bis-(hydroxy-methyl)-5α-pregnane-3-one, reacting the latter with aqueous acetic acid to form 20-bis-(hydroxy-methyl)-5α-pregnane-3-one. This compound may be esterified by reacting, with fuming nitric acid at temperatures about −5° to −15° C. to form 20-bis-(nitrato-methyl)-5α-pregnane-3-one. The reaction scheme is outlined in Table III.

TABLE III

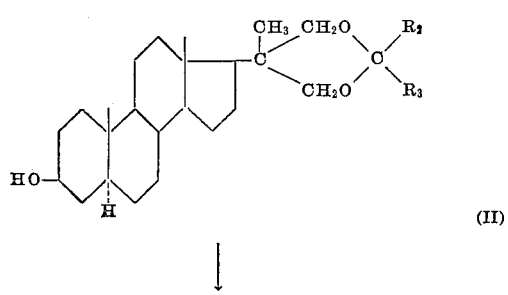

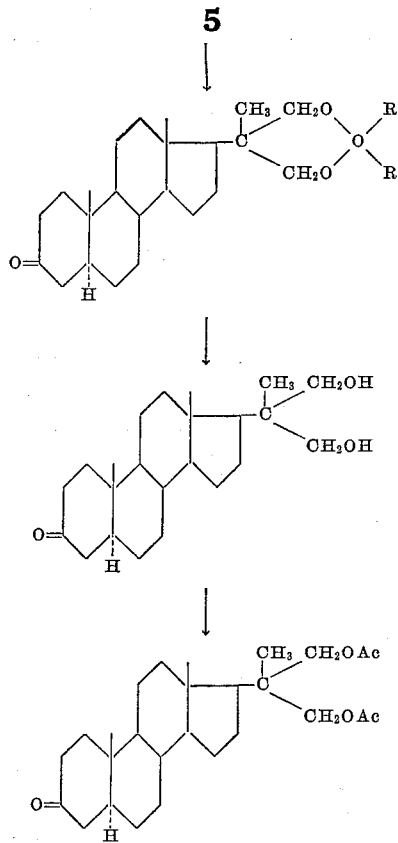

(I)

wherein $R_2$, $R_3$ and Ac have the above definitions.

The term "Ac" and "acyl" used in the above tables and description may represent the acyl radical of an organic carboxylic acid having 1 to 18 carbon atoms or the anion of a mineral acid. Suitable organic carboxylic acids are alkanoic and alkenoic acids such as acetic acid, trimethyl-acetic acid, propionic acid, 4,4-dimethyl pentanoic acid, 10-undecenoic acid; cycloalkylalkanoic acids such as β-cyclopentyl propionic acid; arylalkanoic acids such as phenyl propionic acid; cycloalkanoic acids such as hexahydrobenzoic acid and hexahydroterephthalic acid; and phenyl carboxylic acids such as benzoic acid and 3,5-dinitro benzoic acid. Examples of suitable mineral acids are nitric acid and sulfuric acid.

In the following examples there are described several preferred embodiments to illustrate the invention. However, it should be understood that the invention is not intended to be limited to the specific embodiments.

*Example I*

PREPARATION OF THE ACETONIDE OF 20-BIS-(HYDROXY-METHYL)-5α-PREGNANE-3β-OL

*Step A—Preparation of 20-methoxymethyl-3β-acetoxy-5α-pregnane-20-ol.*—19.9 gm. of magnesium turnings and 1.54 gm. of mercuric chloride were introduced into 241 cc. of tetrahydrofuran. The mixture was agitated at room temperature for a period of three hours, then cooled to 0° C. and there was added thereto, in a period of about thirty minutes, while maintaining the temperature between 0 and +5° C., the solution:

| | Cc. |
|---|---|
| Methoxymethyl bromide | 63.7 |
| Tetrahydrofuran | 241 |

The agitation was contained for a period of thirty minutes at the same temperature. Then a solution of 96.5 gm. of 3β-acetoxy-20-keto allopregnane in 350 cc. of tetrahydrofuran was introduced over a period of about thirty minutes at a temperature between about 0 and +5° C. and the agitation was continued for a period of two hours while maintaining the same temperature.

Next a solution of 140 cc. of 22° Bé. hydrochloric acid in 160 cc. of water containing a small amount of sodium chloride was introduced into the solution, and the organic phases were separated from the aqueous phase.

The aqueous phase was extracted with tetrahydrofuran and the combined tetrahydrofuranic phases were washed successively with a saturated solution of sodium chloride, twice by a saturated solution of sodium chloride and sodium bicarbonate and finally by a saturated solution of sodium chloride until the reaction mixture was neutral. The wash waters were reextracted by tetrahydrofuran. The washed tetrahydrofuranic phases were combined, dried over magnesium sulfate, filtered and evaporated to dryness in a water bath.

The raw product was dissolved in 400 cc. of pyridine and 200 cc. of acetic anhydride were added. The mixture was allowed to remain for a period of eighteen hours and then was poured into 6 liters of a mixture of ice and water. After agitating for a period of one hour, the crystalline precipitate was vacuum filtered, washed with water and dried at 80° C. Purification was effected by repeated trituration with methanol under agitation and at reflux. 83 gm. of 20-methoxymethyl-3β-acetoxy-5α-pregnane-20-ol were obtained, having a melting point of 185–187.5° C.

The product was soluble in tetrahydrofuran and dimethylformamide, slightly soluble in ethanol, acetone, benzene, chloroform and ether, insoluble in water.

*Analysis.*—$C_{25}H_{42}O_4$: Molecular weight=406.59. Calculated: C, 73.85%; H, 10.41%. Found: C, 74%; H, 10.4%.

The compound is not described in the literature.

The starting compound, 3β-acetoxy-20-ketoallopregnane, was prepared after the method described by D. H. R. Barton and J. D. Cox, J. Chem. Soc., 1948, 783–93.

*Step B—Preparation of 20-bis-(hydroxy-methyl)-5α-pregnane-3β-ol.*—29 gm. of 3β-acetoxy-20-methoxymethyl-5α-pregnane-20-ol were subjected to the action of 87 cc. of phosphorus oxychloride. The mixture was agitated for a period of three hours, then poured into a mixture of water and ice and the agitation continued for a further period of thirty minutes. The reaction mixture was neutralized with sodium bicarbonate and agitated for a period of thirty minutes. The residue was vacuum filtered, washed with bicarbonated water, then with water until the wash waters were neutral. 26.5 gm. of 3β-acetoxy-20-formyl-5α-pregnane were obtained, being a yield of 99%. This compound has a melting point of 120–125° C.

26.5 gm. of 3β-acetoxy-20-formyl-5α-pregnane were introduced under an atmosphere of nitrogen into 265 cc. of methanol and 26.5 cc. of 30% formol. 14 cc. of concentrated potassium hydroxide solution were added. The reaction mixture was then agitated for a period of about forty-seven hours and the residue was vacuum filtered, triturated successively with methanol and with water and dried.

The raw product was purified by solution in the hot in dimethylformamide, decolorization with animal charcoal, crystallization in the cold and recrystallization a second time from dimethylformamide. 5.9 gm. of 20-bis-(hydroxy-methyl)5α-pregnane-3β-ol were obtained, having a melting point of 260.5° C.

The product was easily soluble in dimethylformamide, dioxane and tetrahydrofuran, very slightly soluble in ethanol, ether, acetone, benzene and chloroform, insoluble in water.

*Analysis.*—$C_{23}H_{40}O_3$: Molecular weight=364.55. Calculated: C, 75.77%; H, 11.06%. Found: C, 75.7%; H, 11.2%.

This compound is not described in the literature.

*Step C—Preparation of the acetonide of 20-bis-(hydroxy-methyl)-5α-pregnane-3β-ol.*—4.036 gm. of 20-bis-(hydroxy-methyl)-5α-pregnane-3β-ol were placed in suspension in 404 cc. of acetone. The mixture was agitated and 0.6 cc. of 65% perchloric acid added. After complete solution of the pregnane compound, the agitation was continued at room temperature and under nitrogen for a period of three hours. 2 gm. of sodium bicarbonate were added, the agitation continued for a further thirty minute period and then the acetone was removed under vacuum on a water bath.

The crystalline residue obtained was taken up in 250 cc. of water, triturated, vacuum filtered, washed with water until the wash water was neutral, and dried at 80° C. 4.335 gm. of the acetonide of 20-bis-(hydroxymethyl)-5α-pregnane-3β-ol were obtained, being a yield of 96.7% and having a melting point of 150° C. and 170° C.

The product can be recrystallized from acetone or from methanol.

This compound is not described in the literature.

*Example II*

PREPARATION OF 20-BIS-(NITRATOMETHYL)-5α-PREGNANE-3β-OL

Step A—Preparation of 3β-acetoxy-20-bis(hydroxymethyl)-5α-pregnane.—1.5 gm. of the acetonide of 20-bis-(hydroxy-methyl)-5α-pregnane-3β-ol were dissolved in 7.5 cc. of pyridine and 3 cc. of acetic anhydride and the solution was allowed to remain at rest for a period of about three hours.

The solution was then poured under agitation into a mixture of water and ice. The agitation was continued for a period of about two hours and the solution was vacuum filtered. The precipitate was washed several times with water and dried at 60° C. 1.61 gm. of the acetonide of 3β-acetoxy-20-bis-(hydroxy-methyl)-5α-pregnane were obtained, being a yield of 97.6%. This product had a melting point of 120° and 136° C.

1.6 gm. of the raw product were introduced into 16 cc. of 60% acetic acid. The reaction mixture was heated for a period of one hour at 80° C. and then cooled for a period of two hours at a temperature between 0° and +5° C. The precipitate was vacuum filtered, triturated several times with water and dried at 80° C. 1.045 gm. of 3β-acetoxy-20-bis-(hydroxymethyl)-5α-pregnane were obtained, being a yield of 96.5%.

Purification was effected with a yield of 67% by dissolution at reflux in ethyl acetate, cooling for a period of one hour between 0 and +5° C., vacuum filtering, triturating the precipitate with iced ethyl acetate and drying the crystals at 80° C. The product obtained had a melting point of 225° C. and a specific rotation $[\alpha]_D^{20} = -7.7° \pm 3$ (c.=0.5% in dimethylformamide).

The recrystallization can be effected in acetone.

The product was soluble in ethanol, acetone, ethyl acetate and chloroform, slightly soluble in benzene and ether, insoluble in water.

Analysis.—$C_{25}H_{42}O_4$: Molecular weight=406.59. Calculated: C, 73.85%; H, 10.41%. Found: C, 73.7%; H, 10.2%.

This compound is not described in the literature.

Step B—Preparation of 3β-acetoxy-20-bis(nitratomethyl)-5α-pregnane.—4.55 cc. of 48° Bé. nitric acid are introduced slowly into 7.1 cc. of acetic anhydride cooled to −10° C. Then a solution of 0.710 gm. of 3β-acetoxy-20-bis-(hydroxy-methyl)-5α-pregnane in 8.5 cc. of chloroform was added slowly under agitation and under nitrogen at a temperature between about −5° and −10° C. The solution was maintained for a period of twenty minutes at −5° to −10° C. The reaction mixture was poured into 140 cc. of a mixture of water and ice.

The aqueous phase was extracted with chloroform. The organic phase was washed successively with water, with bicarbonated water and again with water until the wash liquors were neutralized. The wash liquors were reextracted with chloroform which was in its turn, rewashed. The chloroform solutions were combined, dried over magnesium sulfate, filtered and evaporated to dryness under vacuum on a water bath.

Purification was effected by agitation in two separate aliquots of ethanol, dissolution in refluxing ethanol, filtration in the hot and recrystallization by cooling to 0° to +5° C. for a period of one hour.

0.697 gm. of 3β-acetoxy-20-bis-(nitratomethyl)-5α-pregnane were obtained, being a yield of 80.4%. This product had a melting point of 150° C. and a specific rotation $[\alpha]_D^{20} = -8°$ (c.=0.5% in dimethylformamide).

The product was soluble in ether, benzene and chloroform, slightly soluble in ethanol and acetone, insoluble in water.

Analysis.—$C_{25}H_{40}O_8N_2$: Molecular weight=496.59. Calculated: C, 60.46%; H, 8.12%; N, 5.64%. Found: C, 60.2%; H, 8%; N, 5.8%.

This compound is not described in the literature.

Step C—Preparation of 20-bis-(nitratomethyl)-5α-pregnane-3β-ol.—0.271 gm. of 3β-acetoxy-20-bis-(nitratomethyl)-5α-pregnane were introduced into 11 cc. of the following solution:

| | Cc. |
|---|---|
| 10 N sodium hydroxide solution | 0.75 |
| Demineralized water | 3.7 |
| Ethanol | 50 | and the reaction mixture was agitated under nitrogen. After eight hours of reaction, crystallization was started by the addition of a small quantity of water. Then the total solution was poured into 110 cc. of a mixture of water and ice. The crystalline precipitate was vacuum filtered, washed with water until the wash water was neutral and dried at 60° C.

Purification of the raw product was effected by dissolution in ethanol at reflux and recrystallization in the cold, then by trituration with ethanol.

0.147 gm. of 20-bis-(nitratomethyl)-5α-pregnane-3β-ol were obtained, being a yield of 70%. This product had a melting point of 90° and 143° C. and a specific rotation $[\alpha]_D^{20} = -6° \pm 3$ (c.=0.5% in dimethylformamide).

The product was soluble in ethanol, ether, acetone, benzene and chloroform, insoluble in water.

Analysis.—$C_{23}H_{38}O_7N_2$: Molecular weight=454.55. Calculated: C, 60.77%; H, 8.43%; N, 6.16%. Found: C, 60.7%; H, 8.4%; N, 5.8%.

This compound is not described in the literature.

*Example III*

PREPARATION OF 20-BIS-(NITRATOMETHYL)-5α-PREGNANE-3-ONE

Step A—Preparation of the acetonide of 20-bis-(hydroxymethyl)-5α-pregnane-3-one.—2.860 gm. of chromic acid were introduced in small amounts into 28.6 cc. of pyridine, cooled to a temperature between about +5 and +10° C. by an ice bath and the temperature of the mixture was allowed to rise. Then a solution of 2.860 gm. of the acetonide of 20-bis-(hydroxy-methyl)-5α-pregnane-3β-ol in 28.6 cc. of pyridine was added. The reaction mixture remained under agitation for a period of eighteen hours. Then 17.2 cc. of methanol were added in order to destroy the excess of the oxidant and the agitation was continued for a period of another two hours. The residue was vacuum filtered, triturated with pyridine and the mixture poured into 750 cc. of a mixture of water and ice. After one hour of rest, the mixture was vacuum filtered and the residue was triturated with water. The product obtained contained salts of chromium. This residue was taken up by 85 cc. of methylene chloride. The solution obtained was filtered, dried over magnesium sulfate and a small quantity of alumina was added. The mixture was agitated for a period of fifteen minutes and filtered on an alumina bed. The magnesium sulfate and alumina were then rinsed and triturated with methylene chloride.

The methylene chloride solutions were combined, evaporated to dryness under normal pressure, then under vacuum. 2.540 gm. of the acetonide of 20-bis-(hydroxy-methyl)-5α-pregnane-3-one were obtained, being a yield of 88–89%, having a melting point of 175° C.

This product can be purified by solution in ethanol at reflux and recrystallization.

This product is not described in the literature.

*Step B—Preparation of 20-bis-(hydroxy-methyl)-5α-pregnane-3-one.*—0.830 gm. of the acetonide of 20-bis-(hydroxy-methyl)-5α-pregnane-3-one were introduced into 26 cc. of 80% acetic acid. The mixture was heated to 80° C. and agitated for a period of one hour. The reaction mixture was cooled to a temperature below 20° C., neutralized with ammonia, diluted with water and allowed to rest for one hour. The crystalline residue was vacuum filtered and washed with water and submitted to saponification. The crystalline residue was then triturated at room temperature with 8.3 cc. of methanol and 0.5 cc. of concentrated potassium hydroxide solution, agitated for a period of two and one-half hours and finally poured into 80 cc. of a mixture of water and ice.

0.722 gm. of 20-bis-(hydroxy-methyl)-5α-pregnane-3-one were obtained, being a yield of 96.7%.

The raw product was purified by dissolution at reflux, recrystallization from dioxane, vacuum filtering and trituration with the same solvent, giving a product having a melting point of 270° C. and a specific rotation $$[\alpha]_D^{20} = +17.8°$$

(c.=0.5% in dimethylformamide).

The raw product may also be purified by recrystallization from dichlorethane or methylene chloride, or by solution in pyridine and reprecipitation with water.

The product was soluble in chloroform, tetrahydrofuran, dioxane and dimethylformamide, slightly soluble in ethanol, acetone and benzene, insoluble in water.

*Analysis.*—$C_{23}H_{38}O_3$: Molecular weight=362.54. Calculated: C, 76.2%; H, 10.56%. Found: C, 75.6%; H, 10.5%.

This compound is not described in the literature.

*Step C—Preparation of 20-bis-(nitratomethyl)-5α-pregnane-3-one.*—12 mg. of 20-bis-(hydroxymethyl)-5α-pregnane-3-one were dissolved in 0.4 cc. of a mixture of 3 cc. of acetic anhydride and 1 cc. of 48° Bé. nitric acid cooled to −10° C. The reaction mixture was allowed to remain for quarter of an hour at −10° to −5° C. and five minutes at +5° C. It was poured into 5 cc. of a mixture of water and ice. The residue was vacuum filtered, washed with water and triturated with 1 cc. of ethanol. 9 mg. of 20-bis-nitratomethyl)-5α-pregnane-3-one were obtained. The raw product could also be recrystallized from acetone, and had a melting point of 172° C. and 176° C. It was soluble in dioxane, slightly soluble in ethanol, insoluble in water.

This compound is not described in the literature.

The 20-bis-(hydroxy-methyl)-5α-pregnanes of the invention can be used orally in the form of tablets or parenterally by intramuscular injection in the form of aqueous or oily suspensions, or even by venous methods in the form of a solution in an adequate excipient and also by rectal method. They can be made in the form of injectable solutions, injectable suspensions, put up in ampules or in flasks, in tablets and in suppositories.

EXAMPLES OF PHARMACEUTICAL COMPOSITIONS

*Tablets Containing 0.5 Mg.*

In an appropriate mixer, there was introduced successively the active compound, white sugar, potato starch and lactose. On the homogenized mixture, there was poured an aqueous solution of gelatine in a quantity necessary and sufficient to obtain a mixture capable of being granulated through a perforated metal die.

The granules obtained were placed on a perforated bed on a dish and put in a ventilated dryer at a temperature of 50° C. The dry granules were ground and passed through a metal screen of appropriate dimension, then mixed with talc and magnesium stearate for lubrication. The granulated powder was transformed into tablets of adequate weight by mechanical pressure in a press. The tolerance of mean weight of a lot of 10 tablets was ±5 per 100 of the theoretical weight. For ingestable commodities, it was found preferable that the weight of the tablets be not more than 750 mg. nor less than 80 mg.

From this fact, the percentage of active principle in the tablets was found preferably to be between 0.6 and 6 per 1,000.

PHARMACOLOGICAL STUDY

*Action on the Coronary Blood Flow*

Study of the action of the said compounds on the coronary blood flow was effected on the isolated heart of the rabbit, utilizing a technique inspired from Langendorff (Arch. Gesam. Physiol., 1895, 61, 291).

In this method, the heart was suspended by the aorta to a tube and the coronary system was perfused by means of this tube under a constant pressure of 5 cm. of mercury by a Locke serum having a pH of 7.2 to 7.3, heated to 37° C. The compound being studied was placed in solution in ethanol and this solution was diluted by means of the Locke serum to the desired concentration. By a proper apparatus, the coronary blood flow was registered and parallelly the ventriculary contractions. The table below furnishes the results obtained by these compounds, as well as the results from 20-bis-(hydroxy-methyl)-5β-pregnane-3α-ol-11-one trinitrine and papaverine, under the same experimental conditions.

| Substance | Threshold Active Concentration in γ/cc. | Increase of Coronary Blood Flow in Percent | Duration in minutes | Effect on the Ventricular Contractions | |
|---|---|---|---|---|---|
| | | | | Amplitude in Percent | Frequency in Percent |
| I | 0.1 | 30 | >25 | 0 | 0 |
| II | 0.5 | 80 | 20 | 0 | 0 |
| III | 0.2 | 20 | >45 | ~0 | 0 |
| IV | 1.0 | 10 | 2–20 | 0 | −5 |
| V | 10.0 | 20 | 15 | 0 | 0 |

I—20-bis-(nitratomethyl)-5α-pregnane-3β-ol.
II—20-bis-(nitratomethyl)-5α-pregnane-3-one.
III—20-bis-(hydroxy-methyl)-5β-pregnane-3α-ol-11-one.
IV—Trinitrine.
V—Papaverine.

*Acute Toxicity*

Toxicity tests were made on mice of the Rockland strain weighing between 18 and 22 gm. The compounds were used in suspension containing 10 mg. per cc. in a dispersing solution. They were injected in this form by subcutaneous method in groups of 10 mice in doses of 50 and 100 mg./kg. respectively. The animals were held under observation for one week. No symptoms of intoxication and mortality, were noted in the course of this period.

20-bis(nitratomethyl)-5α-pregnane-3β-ol was non-toxic in a dosage of 50 mg./kg. while 20-bis(nitratomethyl)-5α-pregnane-3-one was non-toxic at a dosage of 100 mg./kg.

While the compounds of the invention are useful in the treatment of angina of the chest and of the coronaritis, they also possess a peripheral vasodilatory action and antispasmodic activity and are therefore useful in treating asthma, bronchial spasms and arterial spasms.

Various modifications of the process and the products of the invention may be made without departing from the scope or spirit thereof, and it is to be understood that the invention be limited only as defined in the appended claims.

We claim:
1. A compound having the formula

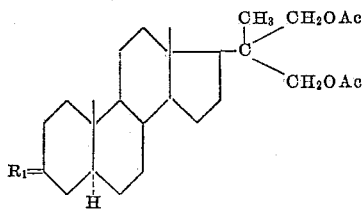

wherein $R_1$ is selected from the group consisting of =O and

and Ac is selected from the group consisting of hydrogen, an acyl radical of an organic carboxylic acid having 1 to 18 carbon atoms and an anion of a mineral acid.
2. 20-bis-(nitratomethyl)-5α-pregnane-3β-ol.
3. 3β-acetoxy - 20 - bis-(nitratomethyl)-5α-pregnane.
4. 3β-acetoxy - 20 - bis-(hydroxy-methyl)-5α-pregnane.
5. 20-bis-(hydroxy-methyl)-5α-pregnane-3β-ol.
6. 20-bis-(hydroxy-methyl)-5α-pregnane-3-one.
7. 20-bis-(nitratomethyl)-5α-pregnane-3-one.
8. A compound having the formula

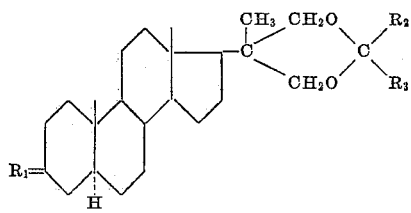

wherein $R_1$ is selected from the group consisting of

and =O and Ac is selected from the groups consisting of hydrogen, an acyl radical of an organic carboxylic acid having 1 to 18 carbon atoms and an anion of a mineral acid and $R_2$ and $R_3$ are selected from the group consisting of hydrogen, phenyl, phenyl substituted lower alkyl and lower alkyl.
9. The acetonide of 20-bis-(hydroxy-methyl)-5α-pregnane-3β-ol.
10. The acetonide of 3β-acetoxy - 20 - bis-(hydroxymethyl)-5α-pregnane.
11. The acetonide of 20-bis-(hydroxy-methyl)-5α-pregnane-3-one.
12. A process for the preparation of a compound having the formula

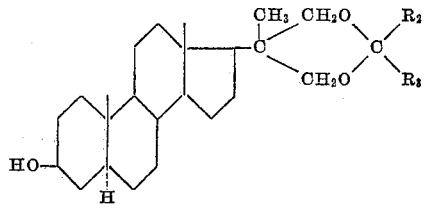

wherein $R_2$ and $R_3$ are selected from the group consisting of hydrogen, phenyl, phenyl substituted lower alkyl and lower alkyl which comprises reacting 3β-acyloxy-5α-pregnane-20-one with a lower alkoxy methyl magnesium halide to form 3β-acyloxy-20-lower alkoxy-methyl-5α-pregnane-20-ol, dehydrating the latter with phosphorous oxychloride to form 3β-acyloxy - 20 - formyl-5α-pregnane, simultaneously condensing the said compound with formaldehyde and saponifying to form 20-bis-(hydroxy-methyl)-5α-pregnane-3β-ol, reacting the said product with a compound selected from the group consisting of

and

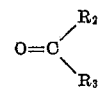

to form the corresponding alkylidene of 20-bis-(hydroxymethyl)-15α-pregnane-3β-ol and recovering the latter.
13. The process of claim 12 wherein the lower alkoxymethyl magnesium halide is methoxy methyl magnesium bromide.
14. The process of claim 12 wherein the simultaneous condensation and saponification is effected with formaldehyde in the presence of methanolic potassium hydroxide.
15. The process of claim 12 wherein 20-bis-(hydroxymethyl)-5α-pregnane-3β-ol is reacted with acetone in the presence of perchloric acid to form the acetonide of 20-bis-(hydroxy-methyl)-5α-pregnene-3β-ol.
16. A process for the preparation of a compound having the formula

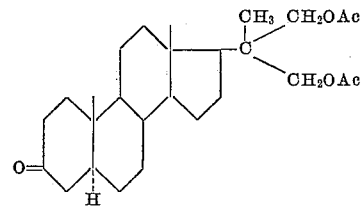

wherein Ac is selected from the group consisting of hydrogen, an acyl radical of an organic carboxylic acid having 1 to 18 carbon atoms and an anion of a mineral acid which comprises oxidizing a compound having the formula

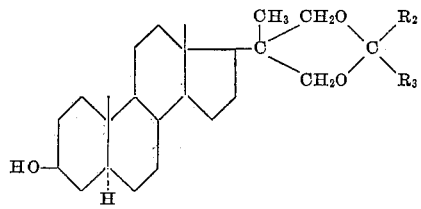

wherein $R_2$ and $R_3$ are selected from the group consisting of hydrogen, phenyl, phenyl substituted lower alkyl and lower alkyl to form a compound having the formula

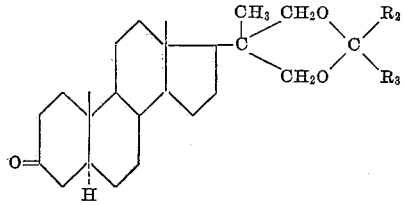

wherein $R_2$ and $R_3$ have the above definitions, hydrolyzing the latter under acidic conditions to form 20-bis-(hydroxymethyl)-5α-pregnane-3-one and recovering the desired compound.
17. A process for the preparation of a compound having the formula

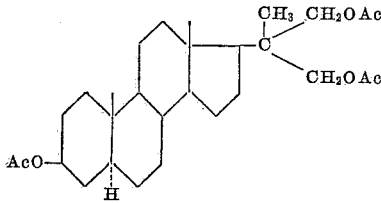

wherein Ac is selected from the group consisting of hydrogen, an acyl radical of an organic carboxylic acid having 1 to 18 carbon atoms and an anion of a mineral acid which comprises reacting a compound having the formula

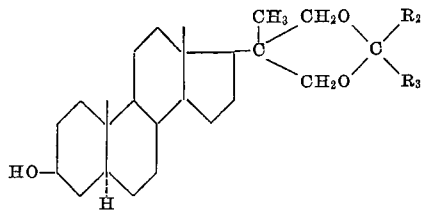

wherein $R_2$ and $R_3$ are selected from the group consisting of hydrogen, phenyl, phenyl substituted lower alkyl and lower alkyl with an acylating agent of an organic carboxylic acid having 1 to 18 carbon atoms to form a compound having the formula

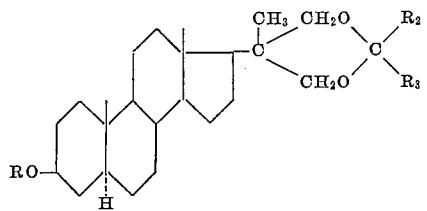

wherein R is an acyl radical of an organic carboxylic acid having 1 to 18 carbon atoms and $R_2$ and $R_3$ have the above definitions, hydrolyzing the latter to form 3β-acyloxy-20-bis-(hydroxy-methyl)-5α-pregnane and recovering the desired compound.

18. The process of claim 17 wherein the first acylating agent is acetic acid anhydride.

19. A process for the preparation of 20-bis-(nitratomethyl)-5α-pregnane-3β-ol which comprises reacting the acetonide of 20-bis-(hydroxy-methyl)-5α-pregnane-3β-ol with acetic acid anhydride to form the acetonide of 3β-acetoxy-20-bis-(hydroxy-methyl)-5α-pregnane, hydrolyzing the latter with aqueous acetic acid to form 3β-acetoxy-20-bis-(hydroxy-methyl)-5α-pregnane, reacting the said product with fuming nitric acid to form 3β-acetoxy-20-bis-(nitratomethyl)-5α-pregnane, saponifying the said product to form 20-bis-(nitratomethyl)-5α-pregnane-3β-ol and recovering the latter.

20. A process for the preparation of 20-bis-(nitratomethyl)-5α-pregnane-3-one which comprises oxidizing the acetonide of 20-bis-(hydroxy-methyl)-5α-pregnane-3β-ol with chromic acid to form the acetonide of 20-bis-(hydroxy-methyl)-5α-pregnane-3-one, hydrolyzing the latter with aqueous acetic acid to form 20-bis-(hydroxy-methyl)-5α-pregnane-3-one, reacting said product with fuming nitric acid to form 20-bis-(nitratomethyl)-5α-pregnane-3-one and recovering the latter.

No references cited.